(12) United States Patent
French, Jr.

(10) Patent No.: US 10,163,459 B1
(45) Date of Patent: Dec. 25, 2018

(54) DATA STORAGE DEVICE EXTENDING SERVO BURST FIELD BY ALTERNATING SERVO FIELD PROCESSING DURING WRITES

(71) Applicant: Western Digital Technologies, Inc., San Jose, CA (US)

(72) Inventor: James B. French, Jr., Whitefish, MT (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/015,024

(22) Filed: Jun. 21, 2018

(51) Int. Cl.
*G11B 20/12* (2006.01)
*G11B 11/105* (2006.01)

(52) U.S. Cl.
CPC .. *G11B 11/10578* (2013.01); *G11B 11/10534* (2013.01); *G11B 11/10595* (2013.01)

(58) Field of Classification Search
CPC ......... G11B 20/08; G11B 27/36; G11B 20/14; G11B 20/16; G11B 20/12
USPC ........................................ 360/29, 31, 40, 48
See application file for complete search history.

(56) References Cited

U.S. PATENT DOCUMENTS

| | | |
|---|---|---|
| 5,784,219 A | 7/1998 | Genheimer |
| 6,388,829 B1 | 5/2002 | Nazarian |
| 7,551,379 B2 | 6/2009 | Yu et al. |
| 7,916,416 B1 | 3/2011 | Guo et al. |
| 8,711,504 B1 | 4/2014 | Everett et al. |
| 8,711,506 B1 | 4/2014 | Giovenzana et al. |
| 8,749,911 B1 | 6/2014 | Sun et al. |
| 8,861,118 B1 | 10/2014 | Creech et al. |
| 9,047,919 B1 | 6/2015 | Guo et al. |
| 9,053,712 B1 | 6/2015 | Guo et al. |
| 9,972,349 B1 * | 5/2018 | French, Jr. ............. G11B 5/012 |
| 2011/0317299 A1 | 12/2011 | Kubota et al. |

* cited by examiner

*Primary Examiner* — Nabil Z Hindi

(57) ABSTRACT

A data storage device is disclosed comprising a head actuated over a disk comprising a plurality of servo tracks and a plurality of data tracks defined by the servo tracks. Each servo track is defined by a first set of servo sectors interleaved with a second set of servo sectors, wherein each servo sector comprises a servo burst field. The servo burst field of the first set of servo sectors has a first length and the servo burst field of the second set of servo sectors has a second length longer than the first length. Data is written to a first data track by reading at least one of the second set of servo sectors and skipping the read of at least part of one of the first set of servo sectors, and servoing the head over the first data track in response to reading the second set servo sector.

12 Claims, 3 Drawing Sheets

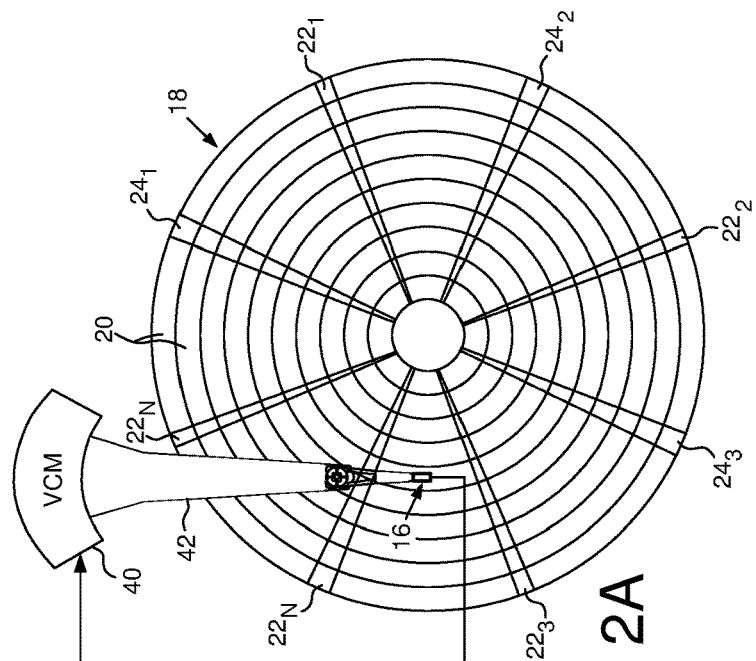
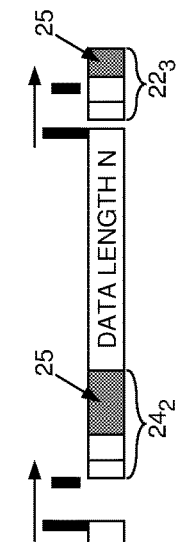
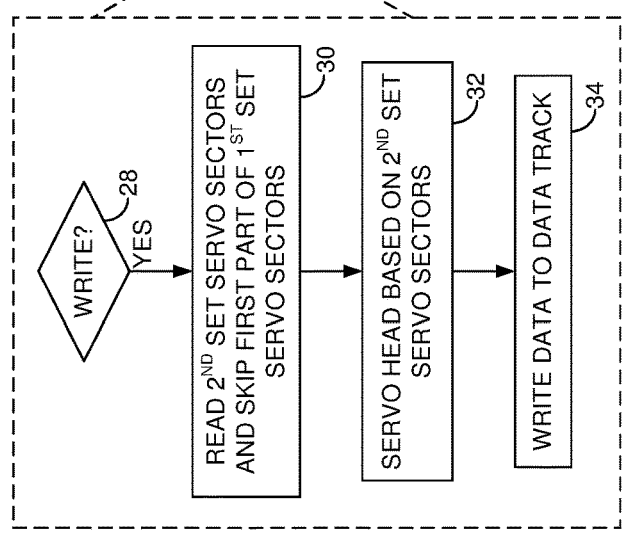
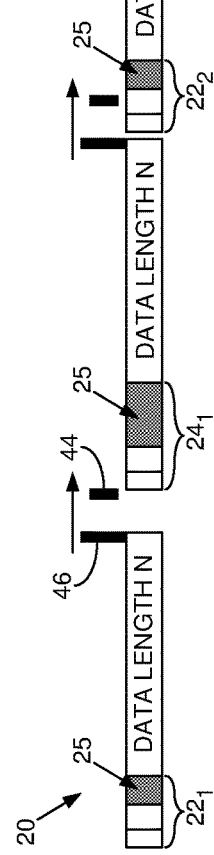

DATA STORAGE DEVICE EXTENDING SERVO BURST FIELD BY ALTERNATING SERVO FIELD PROCESSING DURING WRITES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A show a data storage device in the form of a disk drive according to an embodiment comprising a head actuated over a disk comprising a plurality of servo tracks and a plurality of data tracks defined by the servo tracks.

FIG. 2B shows an embodiment wherein each servo track is defined by a first set of servo sectors interleaved with a second set of servo sectors, each servo sector comprises a servo burst field, and the servo burst field of the first set of servo sectors is shorter than the servo burst field of the second set of servo sectors.

FIG. 2C is a flow diagram according to an embodiment wherein when writing data to a data track a first part of the first set of servo sectors is skipped in order to extend the writing of the preceding data wedge.

DETAILED DESCRIPTION

Figure 1:
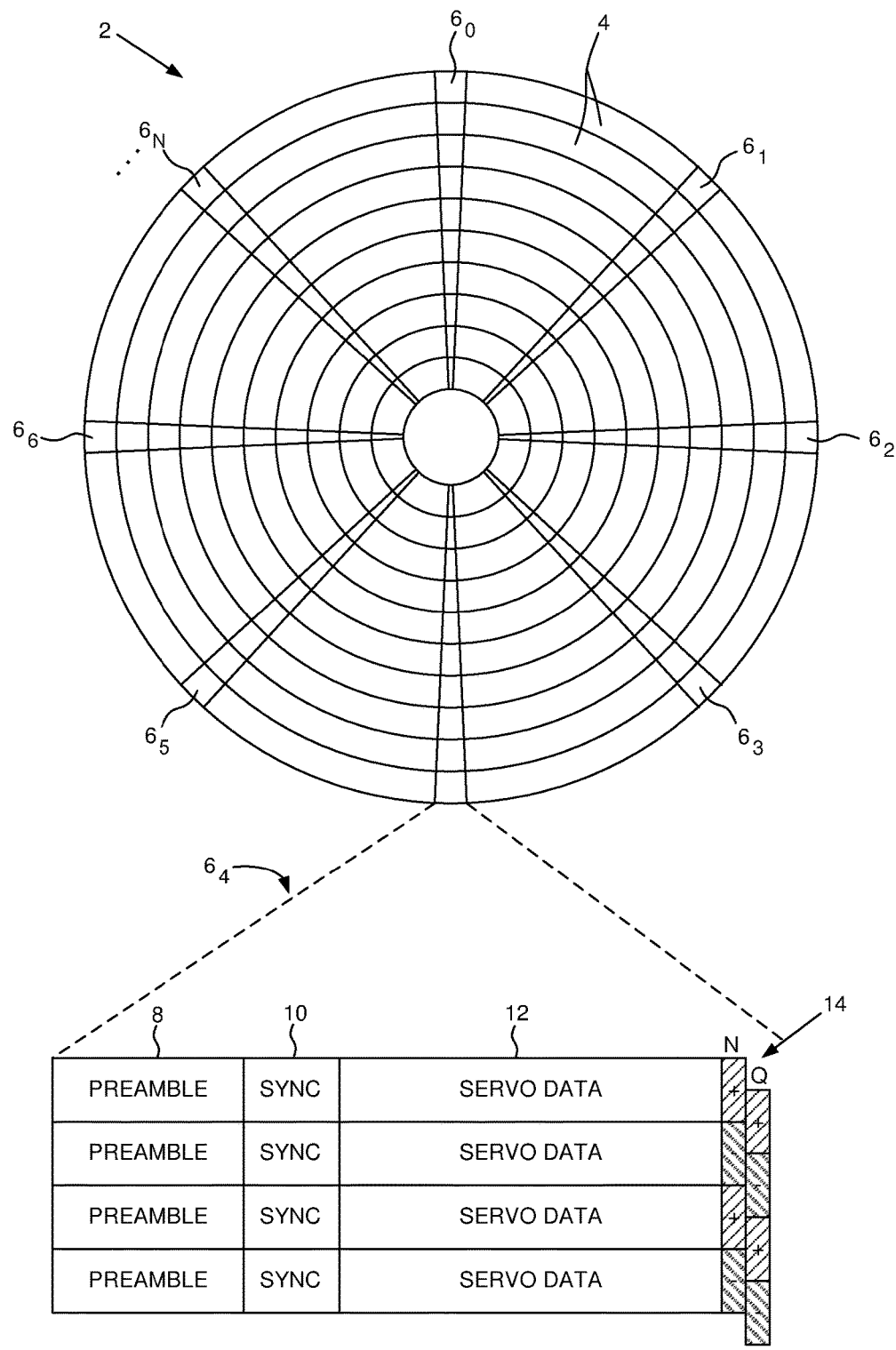
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of servo tracks 20 and a plurality of data tracks defined by the servo tracks. Each servo track 20 is defined by a first set of servo sectors $22_1$-$22_N$ interleaved with a second set of servo sectors $24_1$-$24_N$ (FIG. 2B). Each servo sector comprises a servo burst field 25 (FIG. 3), wherein the servo burst field 25 of the first set of servo sectors $22_1$-$22_N$ has a first length and the servo burst field 25 of the second set of servo sectors $24_1$-$24_N$ has a second length longer than the first length. The disk drive further comprises control circuitry 26 configured to execute the flow diagram of FIG. 2C in order to write data to a first data track during a write operation (block 28) by reading at least one of the second set of servo sectors and skipping the read of at least part of one of the first set of servo sectors (block 30), servoing the head over the first data track in response to reading the second set servo sector (block 32), and writing the data to the first data track (block 34).

In the embodiment of FIG. 2A, the control circuitry 26 processes a read signal 36 emanating from the head 16 to demodulate the servo sectors and generate a position error signal (PES) representing an error between the actual position of the head and a target position relative to a target track. A servo control system in the control circuitry 26 filters the PES using a suitable compensation filter to generate a control signal 38 applied to a voice coil motor (VCM) 40 which rotates an actuator arm 42 about a pivot in order to actuate the head radially over the disk in a direction that reduces the PES. The interleaved servo sectors $22_1$-$22_N$ and $24_1$-$24_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
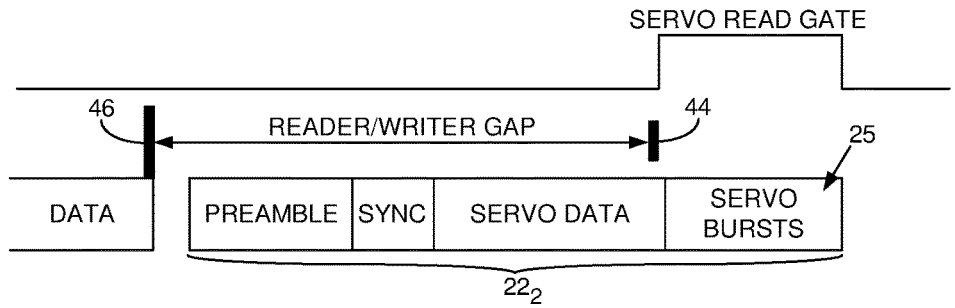
FIG. 3 shows an embodiment wherein during a write operation the servo read gate is opened in time to read the servo burst field of the first set servo sector for use in updating the PES.

In the embodiment of FIG. 2B, the head 16 comprises a read element 44 that is offset along the length of a data track from a write element 46 (down-track offset), resulting in a reader/writer gap as shown in FIG. 3. In one embodiment, the reader/writer gap is exploited during a write operation in order to extend the writing of the data wedges that precede the first set servo sectors $22_1$-$22_N$. As shown in FIG. 2B, when the read element 44 reaches the beginning of second set servo sector $24_1$, the writing of the preceding data wedge terminates so that the read element 44 can begin reading the preamble field of the second set servo sector $24_1$. As a result, there is an unwritten gap in the data wedge preceding the second set servo sector $24_1$ due to the reader/writer gap between the read element 44 and the write element 46. In one embodiment, when the read element 44 reaches the beginning of the first set servo sector $22_2$, the first part of the first set servo sector $22_2$ is not read so that the writing of the preceding data wedge can be extended. Consequently the length of the servo burst field 25 in the second set servo sector $24_1$ may be extended while writing equal length data wedges (of length N) between each of the servo sectors.

In one embodiment, extending the length of the servo burst field 25 in the second set servo sectors enables accurate tracking of the data tracks without compensating for repeatable runout (RRO) of the servo tracks. That is, instead of measuring and writing RRO fields in the servo sectors during a manufacturing process, the servo burst field 25 of the second set servo sectors is extended so as to increase the accuracy of the resulting PES measurement. In one embodiment, the servo burst field 25 of the second set servo sectors is extended so as to consume the linear area otherwise used for an RRO field. This may provide a significant cost reduction during manufacturing by avoiding the need to read each servo track in order to measure the RRO, as well as avoid the time required to write the RRO fields.

FIG. 3 shows an embodiment wherein when reading the first set servo sector $22_2$ during a write operation, the servo read gate is delayed until the read element 44 reaches the beginning of the servo burst field 25. When the servo read gate is asserted, the writing of the preceding data wedge terminates so that the servo bursts in the first set servo sector $22_2$ may be read and demodulated in order to update the PES measurement. That is, during a write operation the preamble, sync and servo data fields of the first set servo sectors are skipped (not read) which means the coarse position information derived from reading the track address is not used to update the PES. However, the fine position information derived from reading the servo burst field 25 of the first set servo sectors is still read and used to update the PES. During seek operations and read operations, the entire first set servo sectors may be read so that both the coarse and fine position information may be used to update the PES.

Figure 4A:
FIG. 4A shows a format of a first set servo sector comprising a first length phase-based servo bursts.
Figure 4B:
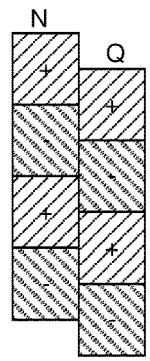
FIG. 4B shows a format of a second set servo sector comprising a second length phase-based servo bursts longer than the first length.
Figure 5A:
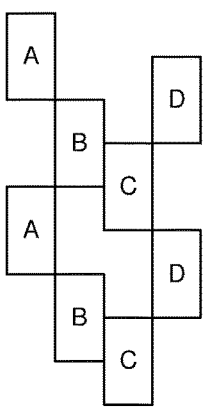
FIG. 5A shows a format of a first set servo sector comprising a first length amplitude-based servo bursts.
Figure 5B:
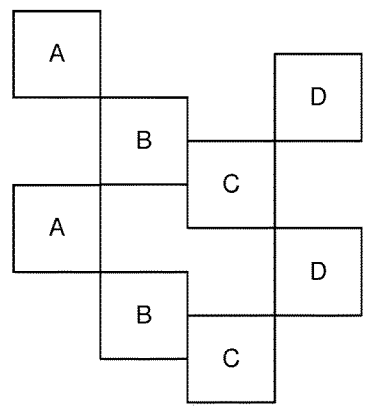
FIG. 5B shows a format of a second set servo sector comprising a second length amplitude-based servo bursts longer than the first length.

The servo burst field 25 of the second set servo sectors 24*i* may be extended in any suitable manner. In an embodiment shown in FIG. 4A, the servo bursts of the first set servo sectors 22*i* may comprise a phase-based servo burst (N and Q bursts) having a predetermined length. When writing the second set servo sectors 24*i*, the length of each phase-based servo burst may be increased as illustrated in FIG. 4B, thereby increasing the accuracy of the resulting PES measurement. FIG. 5A shows an alternative embodiment wherein the servo bursts of the first set servo sectors 22*i* comprise an amplitude-based servo sector (A, B, C, D bursts). When writing the second set servo sectors 24*i*, the length of each amplitude-based servo burst may be increased as illustrated in FIG. 5B, thereby increasing the accuracy of the resulting PES measurement. In yet another embodiment, the length of the servo burst field 25 of the second set servo sectors 24*i* may be increased by duplicating the servo burst patterns, for example, by duplicating the N and Q phase-based servo bursts or by duplicating the A, B, C, D amplitude-based servo bursts.

In one embodiment, at all radial locations across the disk the down-track offset between the read element 44 and the write element 46 shown in FIG. 3 exceeds the length of the beginning part of the first set servo sector $22_2$ that is skipped during a write operation. Accordingly in this embodiment the writing of the preceding data wedge terminates when the read element 44 reaches the servo burst field 25 (as determined by a servo clock). In another embodiment, at some radial locations (e.g., near the outer diameter of the disk) the down-track offset between the read element 44 and the write element 46 may be less than the length of the beginning part of the first set servo sector $22_2$ that is skipped during a write operation. In this embodiment, the writing of the preceding data wedge may terminate before the read element 44 reaches the servo burst field 25 of the first set servo sector $22_2$ (as determined by the servo clock). That is, in one embodiment the reader/writer gap shown in FIG. 3 may be measured relative to the length of a the servo sectors at different radial locations across the disk, wherein the measured reader/writer gap may then be used to determine when to terminate the writing of the data wedge preceding a first set servo sector (i.e., to prevent overwriting the preamble of the first set servo sector). The measured reader/writer gap may also be used to determine the degree to which the servo burst field 25 in the second set servo sectors may be extended across the radius of the disk while retaining equal length data wedges between each servo sector. Any suitable technique may be employed to measure the reader/writer gap, an example of which is disclosed in U.S. Pat. No. 8,749,911 entitled "DISK DRIVE ACCOUNTING FOR FRACTIONAL CLOCK CYCLE WHEN MEASURING READER/WRITER GAP," the disclosure of which is incorporated herein by reference.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored in a non-volatile storage medium (NVSM) and read into a volatile semiconductor memory when the data storage device is powered on. In yet another embodiment, the control circuitry comprises suitable logic circuitry, such as state machine circuitry.

In various embodiments described above, a disk drive may include a magnetic disk drive, an optical disk drive, a hybrid drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk comprising a plurality of servo tracks and a plurality of data tracks defined by the servo tracks, wherein:
        each servo track is defined by a first set of servo sectors interleaved with a second set of servo sectors;
        each servo sector comprises a servo burst field; and
        the servo burst field of the first set of servo sectors has a first length and the servo burst field of the second set of servo sectors has a second length longer than the first length;
    a head actuated over the disk; and
    control circuitry configured to write data to a first data track by:
        reading at least one of the second set of servo sectors and skipping the read of at least part of one of the first set of servo sectors;
        servoing the head over the first data track in response to reading the second set servo sector; and
        writing the data to the first data track.

2. The data storage device as recited in claim 1, wherein the control circuitry is further configured to write data to a first data track by:
    reading the servo burst field of the first set servo sector; and
    servoing the head over the first data track in response to reading the servo burst field of the first set servo sector.

3. The data storage device as recited in claim 1, wherein the control circuitry is further configured to write data to the first data track by:
    writing a first segment of the first data track following one of the first set of servo sectors; and
    writing a second segment of the first data track following one of the second set servo of sectors, wherein the first segment is substantially equal in length to the second segment.

4. The data storage device as recited in claim 3, wherein the head comprises a read element and a write element and the control circuitry is further configured to write data to the first data track using the write element by writing at least part of the second segment while the read element is over the part of the first set servo sector that is skipped.

5. The data storage device as recited in claim 1, wherein the servo burst field of each servo sector comprises a plurality of amplitude based servo bursts.

6. The data storage device as recited in claim 1, wherein the servo burst field of each servo sector comprises a plurality of phase based servo bursts.

7. A method of operating a data storage device, the method comprising writing data to a first data track on a disk defined by a first set of servo sectors interleaved with a second set of servo sectors by:
    using a head to read at least one of the second set of servo sectors and skipping the read of at least part of one of the first set of servo sectors;
    servoing the head over the first data track in response to reading the second set servo sector; and
    writing the data to the first data track,
    wherein:
    each servo sector comprises a servo burst field; and
    the servo burst field of the first set of servo sectors has a first length and the servo burst field of the second set of servo sectors has a second length longer than the first length.

8. The method as recited in claim 7, further comprising writing data to the first data track by:
    reading the servo burst field of the first set servo sector; and
    servoing the head over the first data track in response to reading the servo burst field of the first set servo sector.

9. The method as recited in claim 7, wherein the control circuitry is further configured to write data to the first data track by:
    writing a first segment of the first data track following one of the first set of servo sectors; and
    writing a second segment of the first data track following one of the second set servo of sectors, wherein the first segment is substantially equal in length to the second segment.

10. The method as recited in claim 9, wherein the head comprises a read element and a write element and the control circuitry is further configured to write data to the first data track using the write element by writing at least part of the second segment while the read element is over the part of the first set servo sector that is skipped.

11. The method as recited in claim 7, wherein the servo burst field of each servo sector comprises a plurality of amplitude based servo bursts.

12. The method as recited in claim 7, wherein the servo burst field of each servo sector comprises a plurality of phase based servo bursts.

* * * * *